United States Patent [19]

Hood, Jr. et al.

[11] 4,170,100
[45] Oct. 9, 1979

[54] TREE SHAKER

[75] Inventors: Clarence E. Hood, Jr., Clemson, S.C.; Yekutiel Alper, Rishon-Leziyyon, Israel; Byron K. Webb, Clemson, S.C.

[73] Assignee: Clemson University, Clemson, S.C.

[21] Appl. No.: 834,325

[22] Filed: Sep. 19, 1977

[51] Int. Cl.² .......................................... A01D 46/00
[52] U.S. Cl. .............................................. 56/328 TS
[58] Field of Search ................ 56/328 TS; 74/52, 86, 74/804

[56] References Cited

U.S. PATENT DOCUMENTS

| 2,506,736 | 5/1950 | Oschwald | 74/52 |
| 2,754,687 | 7/1956 | Brandon | 74/52 |
| 3,041,811 | 7/1962 | Sides | 56/328 TS |
| 3,044,310 | 7/1962 | Weber | 74/86 |
| 3,121,304 | 2/1964 | Herbst | 56/328 TS |
| 3,307,434 | 3/1967 | Kope | 74/804 |
| 3,392,517 | 7/1968 | Nye | 56/328 TS |
| 3,406,508 | 10/1968 | Fridley | 56/328 TS |
| 3,509,702 | 5/1970 | Rickerd | 56/328 TS |
| 3,594,999 | 7/1971 | Savage | 56/328 TS |
| 3,596,455 | 8/1971 | Adrian | 56/328 TS |
| 3,771,768 | 11/1973 | Gebendinger | 56/328 TS |
| 3,780,510 | 12/1973 | Tompkins | 56/328 TS |
| 3,913,409 | 10/1975 | Opderbeck | 74/52 |
| 4,031,626 | 6/1977 | Alexander | 56/328 TS |

Primary Examiner—Louis G. Mancene
Assistant Examiner—Paul J. Hirsch
Attorney, Agent, or Firm—Wellington M. Manning, Jr.; Luke J. Wilburn, Jr.

[57] ABSTRACT

A device operable for engagement with selected tree portions to convert rotary motion to a linear shaking motion for use in a fruit harvesting operation. The tree shaker includes tree gripping elements with a motion converter operatively connected thereto, the motion converter including a rotary mass having an input drive thereto operable to displace the mass in a first direction with control means to effect a counter-rotation of the mass in response to the first direction displacement, whereby the combination drive control results in a linear reciprocating motion of the mass which is transferred to the associated gripping means for shaking the tree portion. The apparatus can include a single motion converter for use in shaking a tree or limb or a pair of motion converters for use in shaking a tree trunk or a large tree limb. When a pair of motion converters are utilized the control means is operable for driving both converter means at the same speed and in phase to obtain a constant linear reciprocating shaking motion, or is operable for driving the two motion converters at different speeds such that the phase angle between the two converters is continuously changing to provide a continuously variable shaking action.

6 Claims, 8 Drawing Figures

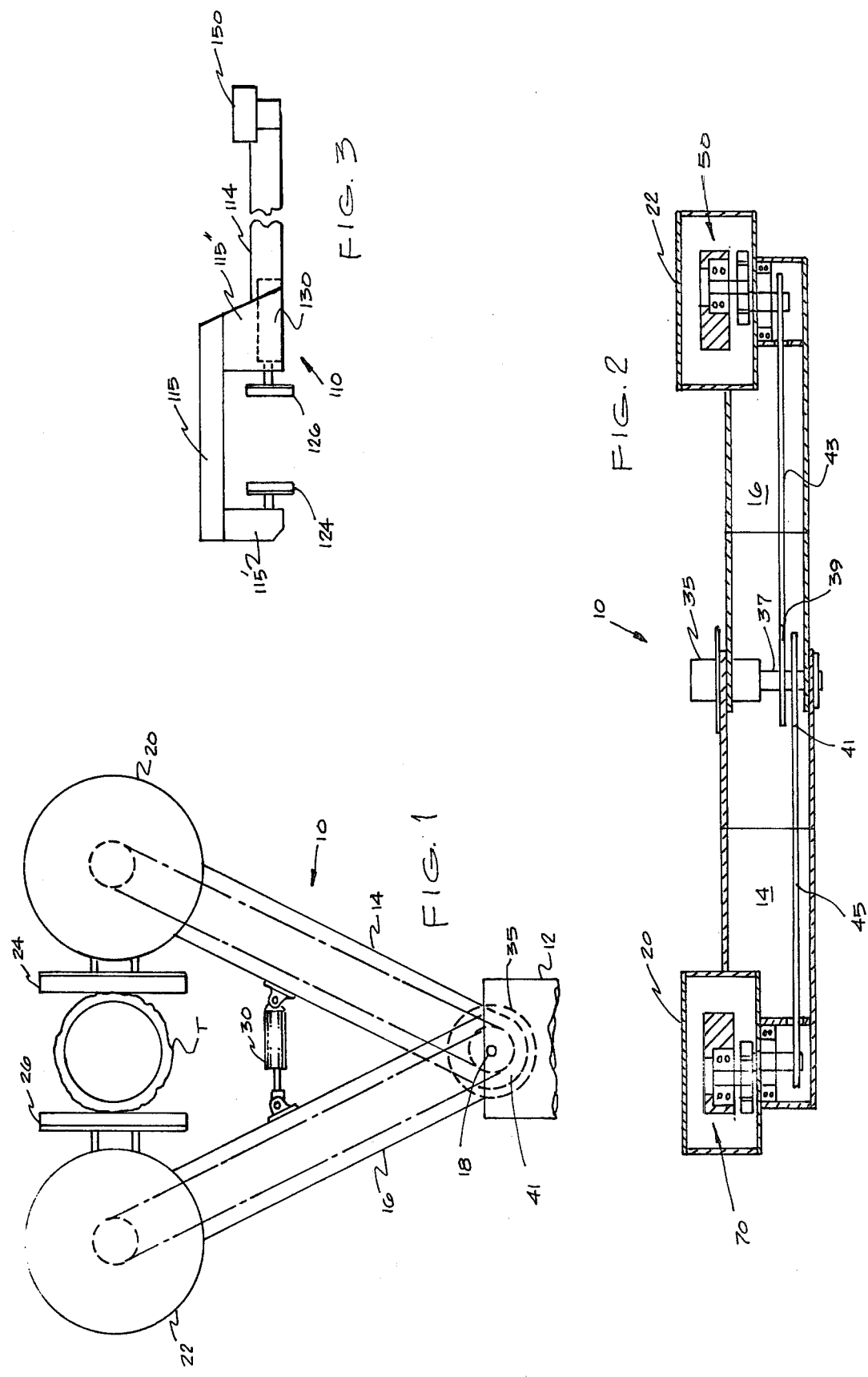

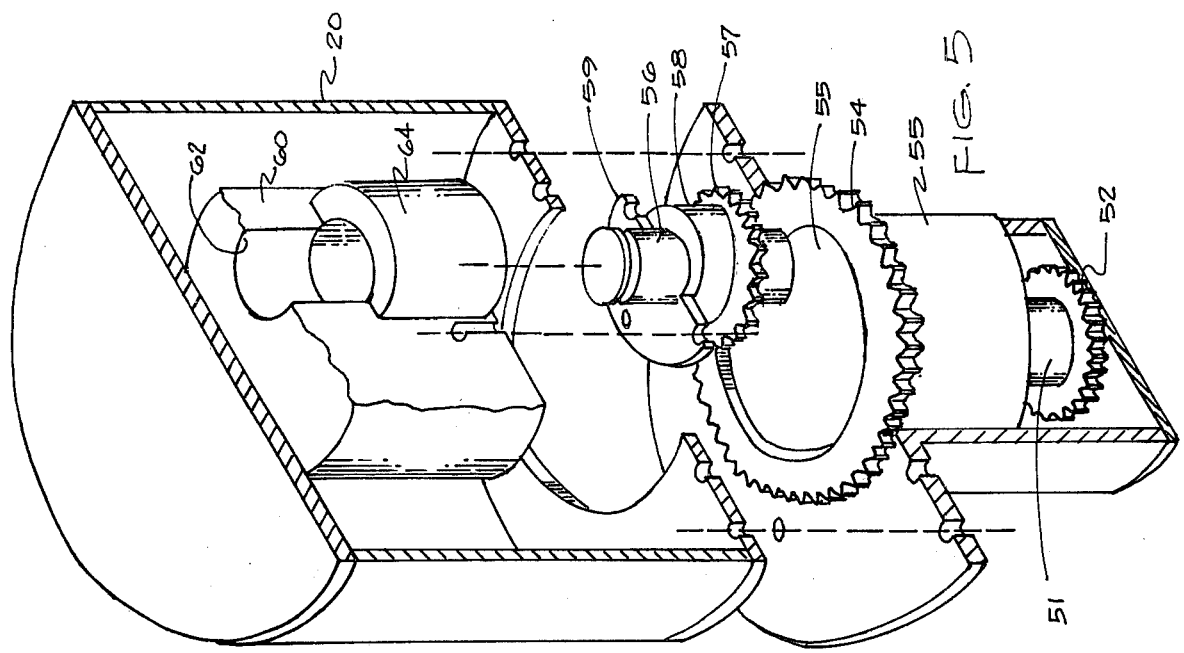
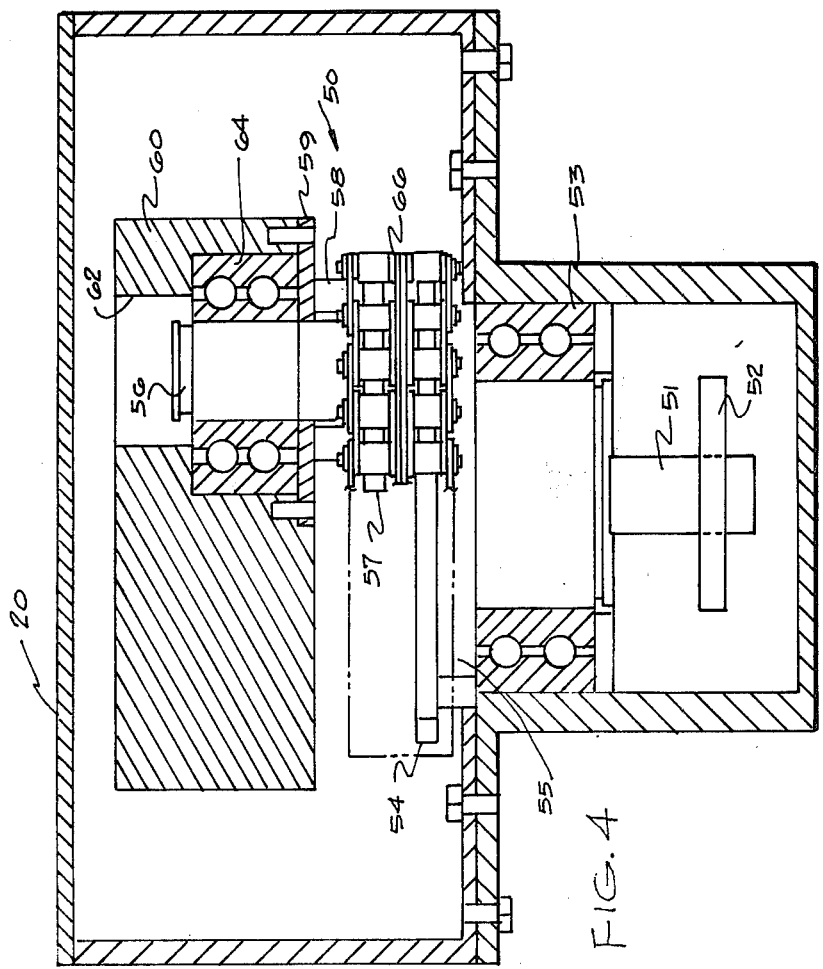

TREE SHAKER

BACKGROUND OF THE INVENTION

This invention relates to apparatus for engagement with a portion of a tree to impart a force against the tree and cause the same to shake, whereby fruit or the like becomes disconnected from the tree and falls into appropriate receiving apparatus. Particularly the present invention is directed to means for converting rotary input motion from a power source to a linear reciprocating motion and transferring the reciprocating motion to a tree portion with which the means is engaged.

Generally the prior art tree shakers that are currently commercially available are of two types: (1) a slider crank mechanism, which may or may not be an inertia type shaker, and which provides a linear shaking motion, and (2) rotating eccentric masses which normally do not provide linear motion. The prior art mechanisms require considerable space, develop excessive wear, and experience maintenance problems in developing shaking motions required in a fruit harvesting operation. The tree shaker of the present invention is compact, efficient and has a low maintenance profile whereby an improvement over prior art devices results.

SUMMARY OF THE INVENTION

It is an object of the present invention to provide an improved apparatus for use in shaking fruit bearing trees during harvesting of the fruit.

Another object of the present invention is to provide an improved tree shaker.

Still another object of the present invention is to provide apparatus for converting rotary motion to linear motion for shaking trees and the like.

Yet another object of the present invention is to provide a tree shaking apparatus that may be used for shaking a tree at its trunk or for shaking limbs of the tree.

Generally speaking the tree shaker of the present invention comprises gripping means operable for engagement with a tree portion and motion converter means operatively associated with said gripping means, said motion converter means comprising a rotating mass; input rotary drive means for said mass, and counter rotary means connected between said rotary drive means and said mass for converting said input rotary drive means to linear reciprocating motion at said mass.

More specifically the tree shaker of the present invention is provided with a pair of gripper plates operated between an open position and a closed, tree engaging, shaking position, means associated with said gripper plates to move same from said open to said closed position, and at least one motion converter associated with one of said gripper plates. In certain embodiments a motion converter may be associated with both gripper plates, with the motion converters in phase or out of phase with each other. Furthermore, one or both gripper plates may be movable to change the gripper means from an open to a closed position.

The motion converter is provided an input rotary power from a hydraulic motor or the like. A rotatable mass is eccentric to the rotary input shaft and is provided with a rotary converting means which converts the rotary input power to a reciprocating linear motion or power, whereby the mass reciprocates, imparting a linear striking force to the gripper plate which transfers same to the tree portion to set up a shaking of the tree portion for dislodgement of fruit therefrom. The rotary input force is transferred to linear reciprocating force by use of a planetary gear arrangement, a pair of different, superimposed connected gears, or the like.

Apparatus of the present invention may be used to shake a fruit bearing tree to institute a proper force to cause the fruit to break away from the tree and fall onto a collector or the ground. In this regard, for fruit that requires care in handling, the apparatus of the present invention may be employed in conjunction with other harvesting equipment to collect the fruit without excessive fruit damage and handle same for further processing.

BRIEF DESCRIPTION OF THE DRAWINGS

FIG. 1 is a plan view of a tree shaking apparatus according to the teachings of the present invention.

FIG. 2 is an end elevation view of the tree shaking apparatus of FIG. 1 with a portion of same broken away and shown in section for the purpose of clarity.

FIG. 3 is a plan view of a further embodiment of a tree shaking apparatus embodying the principles of the present invention.

FIG. 4 is a vertical sectional view taken substantially transversely through a motion converter embodying the principles of the present invention.

FIG. 5 is an enlarged exploded perspective view illustrating the motion converter shown in FIG. 4.

DESCRIPTION OF THE PREFERRED EMBODIMENTS

Figure 6:
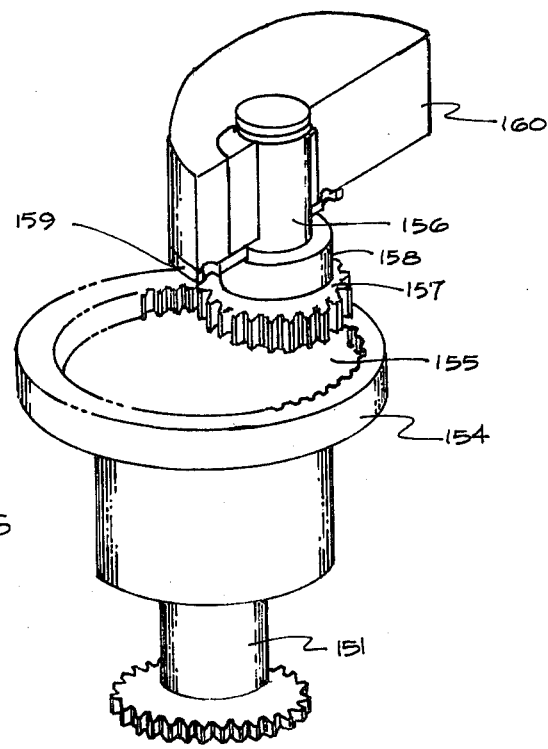
FIGS. 6 and 7 are partial perspective views of further embodiments of motion converters according to the teachings of the present invention.

Referring to the Figures, a tree shaker embodying the principles of the present invention is generally represented by the reference numeral 10 and will be specifically described with reference to a first embodiment (FIGS. 1 and 2), a second embodiment (FIG. 3) and to motion converters (FIGS. 4, 5, 6, and 7) that may be employed in either of the first or second embodiments.

The tree shaker 10 shown in FIGS. 1 and 2 includes a base support frame means 12 having a pair of swing arm housings 14 and 16 pivotally supported on base frame 12 and operable for angular adjustment about a pivot axis 18. Angular adjustment of the swing arm housings 14 and 16 is effected by a conventional hydraulic cylinder means 30 which is operable for moving the swing arm housings 14 and 16 from an open tree releasing position (not shown) to a closed tree gripping position as illustrated in FIG. 1. Supported adjacent the extended end of each of the swing arm housings 14 and 16 are cylindrical housing portions 20 and 22 respectively which contain a motion converter, the details of which will be described hereinafter. A pair of tree engaging or gripper elements 24 and 26 respectively, are supported on cylindrical housing portions 20 and 22 with the gripper elements 24 and 26 being adapted for engaging a tree portion when the swing arm housings 14 and 16 are disposed in a closed, tree gripping position, i.e., engaging a portion of a tree T on opposite sides of same. A drive means 35, exemplified by a conventional hydraulic motor, is coaxially supported relative to base frame pivot axis 18 and includes a drive shaft 37 having a pair of axially spaced sprockets 39 and 41 received thereon. A first drive chain 43 is connected to sprocket 39 and extends through swing arm housing 16 for driving the motion converter generally indicated as 50 located within cylindrical housing portion 22 while a second drive chain 45 is connected to sprocket 41 and extends through swing arm housing 14 for driving a motion converter generally indicated as 70 located within cylindrical housing portion 20.

With drive means 35 operational and gripping elements 24 and 26 in engagement with a portion of a tree T, rotary motion is provided to converters 50 and 70 where the rotary motion is converted to a linear reciprocating motion which is transferred to tree T through gripper elements 24 and 26.

FIG. 3 illustrates a further embodiment of tree shaker generally indicated as 110 according to the teachings of the present invention. Tree shaker 110 includes an elongated frame 114 that has a generally U shaped section 115 at an outer end thereof. A stationary gripper element 124 is secured to an outer leg 115' of U shaped section 115 with a movable gripper element 126 being received along an inner leg 115'' of U shaped section 115, located opposite gripper element 124. Gripper element 126 is operatively associated with an adjustment means 130, as exemplified by a hydraulic cylinder, to move element 126 from an open, non-gripping position to a closed, tree gripping position. A single motion converter 150 is associated with frame 114 to receive rotary power from a power source (not shown) and provide linear reciprocating motion to the tree portion through frame 114 and gripper element 126. Normally tree shaker 110 is provided with an elongated support means whereby the device can be deployed along tree limbs up in the tree. On the other hand, tree shaker 10 as described in FIG. 1 is generally deployed around the trunk of a tree, or perhaps the base of a large tree limb. Of course, each embodiment includes control means, not shown, for actuation of same remote from the actual elements.

Figure 8:
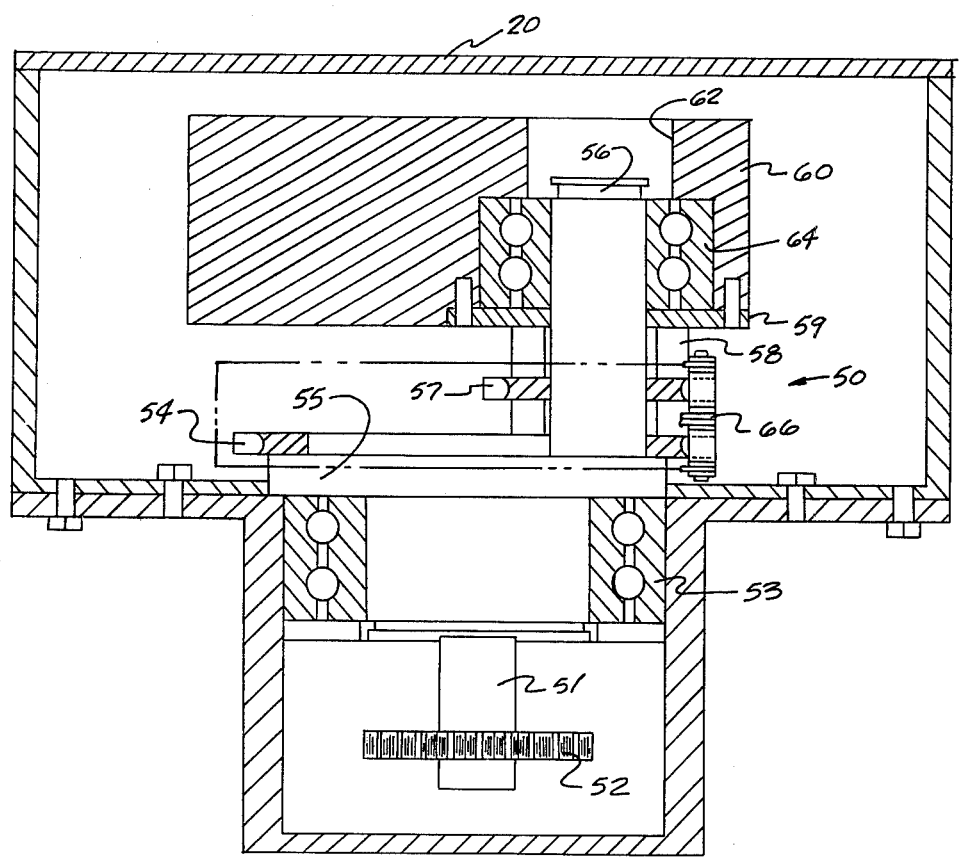
FIG. 8 is a vertical sectional view as illustrated in FIG. 4, better illustrating the relationship between the input drive shaft and the motion converter.

Referring particularly to FIGS. 4, 5 and 8 a motion converter embodying principles according to the present invention is generally indicated as 50 and is contained within a cylindrical housing portion 20. Housing portion 20 is sized to receive motion converter 50 with ample space to permit conversion of motion therein. Motion converter 50 includes an input drive shaft 51 with a drive sprocket 52 received along a lower portion thereof. Drive sprocket 52 receives chain drive 43 from the drive means 35 to provide the rotary motion to converter 50. Input drive shaft 51 is journaled for rotation in a suitable bearing 53 within housing 20 and has a first converter sprocket 54 secured against rotation around an enlarged portion 55 thereof. A further drive shaft portion 56 is integral with upper enlarged end 55 and is located eccentric to the axis of input drive shaft 51 at enlarged portion 55. A second converter sprocket 57 is received for rotation around drive shaft portion 56 immediately adjacent first sprocket 54 and is secured to a rotary mass 60 by collar 58 and plate 59. Rotary mass 60 is received within an upper part of housing 20 and has an opening 62 therethrough, into which drive shaft portion 56 is journaled for rotation in a bearing 64. Sprockets 54 and 57 are coupled by a double chain 66 whereby rotary motion from input drive shaft 51 is imparted to drive shaft portion 56 which causes second converter sprocket 57 to rotate around its corresponding portion of chain 66 in a direction counter to rotation of shaft 51.

Eccentric displacement of drive shaft portion 56 plus the radius of sprocket 57 equals the radius of first sprocket 54 wherein angular displacement of shaft portion 56 and sprocket 57 will form a circular path equal to the circumference of sprocket 54. Rotation of input drive shaft 51 thus causes shaft portion 56 to be angularly displaced about the axis of the input drive shaft with sprocket 57 being accordingly angularly displaced about the axis of shaft 51. Since sprockets 54 and 57 are connected by double chain 66, sprocket 57 "walks" around chain 66 thus effecting a counter rotation of sprocket 57 and mass 60. The relative number of teeth between sprockets 54 and 57 is such to cause one revolution of mass 60 with one revolution of drive shaft 51. Further since the center of rotary mass 60 has the same eccentricity as shaft portion 56 about input drive shaft 51, the center of mass 60 moves essentially along a straight line. Mass 60 is thus provided with a linear motion which affords the desired linear reciprocating force.

FIG. 6 illustrates a portion of a further embodiment of a motion converter according to the present invention. An input drive shaft 151 receives rotary motion from a source not shown and has an enlarged portion 155 and an eccentric shaft portion 156. A sun gear 154 is located about enlarged shaft portion 155 and is secured against rotation thereat. A planet gear 157 is rotatably received around a lower end of shaft portion 156 and meshes with sun gear 154, while being secured to a rotating mass 160 by way of a sleeve 158 and plate 159. Rotary mass 160 is rotatably received around an upper end of shaft portion 156. As with the embodiments of the motion converter as shown in FIGS. 4 and 5, input drive shaft 151 is rotated by a power source, such as a hydraulic motor, causing a counter rotation of planet gear 157 around sun gear 154 which produces a reciprocating linear motion of mass 160 as described hereinabove.

Figure 7:
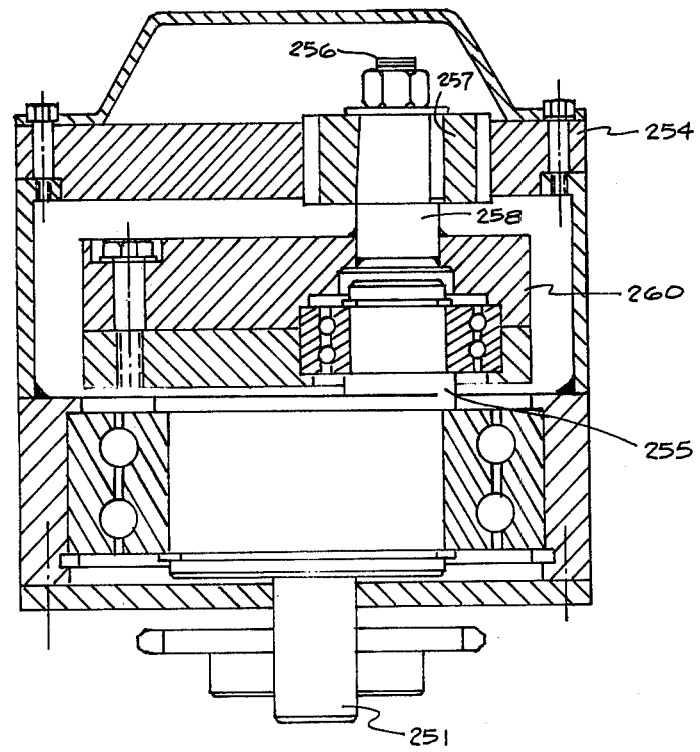

FIG. 7 illustrates a most preferred embodiment of motion converter means according to the present invention. An input drive shaft 251 having an enlarged portion 255 and an eccentric shaft portion 256 is provided. A rotary mass 260 is eccentrically received for rotation around eccentric shaft portion 256 adjacent enlarged portion 255 and secured thereat. Located above rotary mass 260 is a sun gear 254 which is secured against rotation, to housing 220 for example. A planet gear 257 is secured around an upper portion of eccentric shaft portion 256 and is secured to mass 260 through collar 258 and is located in meshing relationship with sun gear 254. Planet gear 257 walks around sun gear 254 during rotation of drive shaft 251 to translate the rotary motion of drive shaft 251 to the reciprocating linear motion of mass 260.

The magnitude of the force can be varied by varying the masses 60, 160, 260 and the eccentricity of the shaft portions 56, 156, 256 with respect to the input drive shafts 51, 151, 251. Further more, various frequencies can be obtained by modification to the drive motion and/or the motion converter.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. Tree shaking apparatus comprising:
   (a) a frame, said frame comprising a pair of pivotally connected arms, each arm having a gripping element thereon, said arms being moveable about said pivotable connection to move said gripping elements into and out of gripping engagement;
   (b) motion converter means operatively associated with the gripping element of each arm, said motion converter means comprising an input drive shaft, a portion of said shaft being eccentric to the axis of said drive shaft, a rotatable mass rotatably received around said eccentric shaft portion, a first sprocket secured to said rotary mass and received around said eccentric shaft portion, a second sprocket secured against rotation adjacent said first sprocket and a double chain connecting said sprockets, whereby rotation of said drive shaft causes said first sprocket to move in a direction counter thereto, following a path around said second sprocket; and
   (c) power means located at the pivotal connection of said arms, said power means being operatively associated with the drive shafts of said motion converter means.

2. Tree shaking apparatus comprising:
   (a) a frame;
   (b) means located on said frame for gripping a tree portion in holding engagement;
   (c) motion converter means operatively associated with said tree gripping means, said motion converter means comprising an input drive shaft, a portion of said shaft being eccentric to the axis of said drive shaft, a rotatable mass rotatably received around said eccentric shaft portion and eccentric drive connection means received around said eccentric shaft portion and being secured to said mass, said drive connection means having a track means to cause the drive connection means to rotate counter to the direction of rotation of said shaft; and
   (d) power means for operating said motion converter means, said power means being operatively associated with said drive shaft.

3. Tree shaking apparatus as defined in claim 2 wherein said frame comprises an elongated member having an offset at an end, said offset having a first stationary gripping element thereat and a second movable gripping element thereat, said movable gripping element having means associated therewith, for moving said element toward and away from said stationary element.

4. Tree shaking apparatus as defined in claim 2 wherein said frame comprises a pair of pivotally connected arms, each arm having a gripping element thereon, said arms being movable about said pivotal connection to move said gripping elements into and out of gripping engagement.

5. Tree shaking apparatus as defined in claim 4 wherein said power means is located at said pivotal connection and wherein each arm has a motion converter producing means.

6. Tree shaking apparatus as defined in claim 5 wherein said eccentric drive connection means comprises a planet gear received for rotation around said eccentric portion of said shaft and secured to said mass and a sun gear secured around a further portion of said shaft and being in meshing relationship with said planet gear.